(12) United States Patent
Son et al.

(10) Patent No.: US 11,842,447 B2
(45) Date of Patent: *Dec. 12, 2023

(54) LOCALIZATION METHOD AND APPARATUS OF DISPLAYING VIRTUAL OBJECT IN AUGMENTED REALITY

(71) Applicant: Samsung Electronics Co., Ltd., Suwon-si (KR)

(72) Inventors: MinJung Son, Suwon-si (KR); Hyun Sung Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/335,199

(22) Filed: Jun. 1, 2021

(65) Prior Publication Data

US 2021/0287438 A1    Sep. 16, 2021

Related U.S. Application Data

(63) Continuation of application No. 16/259,420, filed on Jan. 28, 2019, now Pat. No. 11,037,368.

(30) Foreign Application Priority Data

Sep. 11, 2018 (KR) .................. 10-2018-0108252

(51) Int. Cl.
*G06T 19/00* (2011.01)
*G02B 27/01* (2006.01)
*G06F 3/01* (2006.01)

(52) U.S. Cl.
CPC .......... *G06T 19/003* (2013.01); *G02B 27/01* (2013.01); *G06F 3/011* (2013.01); *G06T 19/006* (2013.01)

(58) Field of Classification Search
CPC .. G06T 19/003; G06T 19/006; G06K 9/00791
See application file for complete search history.

(56) References Cited

U.S. PATENT DOCUMENTS 8,711,206 B2   4/2014  Newcombe et al.
9,524,434 B2  12/2016  Gee et al.
(Continued)

FOREIGN PATENT DOCUMENTS

EP    3 056 861 A1    8/2016
JP    2014-127027 A   7/2014
(Continued)

OTHER PUBLICATIONS

Sohn, Eun-Ho, et al. "VRML image overlay method for Robot's Self-Localization." *Proceedings of the KIEE Conference*, The Korean Institute of Electrical Engineers, 2006 (4 pages in Korean).

(Continued)

*Primary Examiner* — Yi Yang
(74) *Attorney, Agent, or Firm* — NSIP Law

(57) ABSTRACT

Disclosed is a localization method and apparatus that may acquire localization information of a device, generate a first image that includes a directional characteristic corresponding to an object included in an input image, generate a second image in which the object is projected based on the localization information, to map data corresponding to a location of the object, and adjust the localization information based on visual alignment between the first image and the second image.

25 Claims, 14 Drawing Sheets

(56) References Cited

U.S. PATENT DOCUMENTS

| | | | |
|---|---|---|---|
| 2005/0180602 A1* | 8/2005 | Yang | G06V 20/64 |
| | | | 382/168 |
| 2008/0195315 A1 | 8/2008 | Hu et al. | |
| 2012/0300020 A1 | 11/2012 | Arth et al. | |
| 2013/0294642 A1* | 11/2013 | Wang | G06V 40/171 |
| | | | 382/118 |
| 2014/0323148 A1 | 10/2014 | Schmalstieg et al. | |
| 2015/0356741 A1* | 12/2015 | Osa | G06F 18/23213 |
| | | | 382/180 |
| 2016/0061612 A1 | 3/2016 | You et al. | |
| 2016/0275645 A1 | 9/2016 | Maruyama et al. | |
| 2016/0284125 A1 | 9/2016 | Bostick et al. | |
| 2016/0358383 A1 | 12/2016 | Gauglitz et al. | |
| 2017/0091951 A1 | 3/2017 | Yoo et al. | |
| 2017/0169300 A1 | 6/2017 | Heisele et al. | |
| 2017/0206643 A1 | 6/2017 | Weiss et al. | |
| 2018/0075643 A1 | 3/2018 | Sequeira et al. | |
| 2018/0089905 A1 | 3/2018 | Solenthaler et al. | |
| 2018/0149487 A1 | 3/2018 | Lee et al. | |
| 2018/0122098 A1 | 5/2018 | Wang et al. | |
| 2018/0180422 A1 | 6/2018 | Naito | |
| 2018/0227485 A1 | 8/2018 | Shimauchi et al. | |
| 2019/0050648 A1 | 2/2019 | Stojanovic et al. | |
| 2019/0122115 A1* | 4/2019 | Wang | G06T 7/337 |
| 2020/0119830 A1* | 4/2020 | Milione | G06V 10/454 |

FOREIGN PATENT DOCUMENTS

| | | |
|---|---|---|
| JP | 5968064 B2 | 8/2016 |
| JP | 2016-162260 A | 9/2016 |
| KR | 10-0774591 B1 | 11/2007 |
| KR | 10-2014-0132958 A | 11/2014 |
| WO | WO 2006/035755 A1 | 4/2006 |

OTHER PUBLICATIONS

Gavrila, Dariu M., "A Bayesian, Exemplar-Based Approach to Hierarchical Shape Matching", *IEEE Transactions on Pattern Analysis and Machine Intelligence*, vol. 29, Issue 8, Aug. 2007 (pp. 1-14).

Li, Hao et al., "Localization for Intelligent Vehicle by Fusing Mono-camera, Low-cost GPS and Map Data." *13th International IEEE Conference on Intelligent Transportation Systems*, 2010 (pp. 1657-1662).

Schreiber, Markus et al., "LaneLoc: Lane Marking based Localization using Highly Accurate Maps", *2013 IEEE Intelligent Vehicles Symposium (IV)*, Jun. 23-26, 2013 (pp. 449-454).

Engel, Jakob, et al., "LSD-SLAM: Large-Scale Direct Monocular SLAM," *European Conference on Computer Vision*, 2014 (6 pages in English).

Engel, Jakob et al., "Large-scale direct SLAM with stereo cameras", 2015 IEEE/RSJ International Conference on Intelligent Robots and Systems (IROS), Sep. 2015 (1 page in English).

Stückler, Jörg et al., "Direct SLAM for Monocular and Stereo Cameras", *Computer Vision Group-Visual SLAM*, Dec. 7, 2018 (2 pages in English).

Extended European Search Report dated Jan. 28, 2020 in counterpart European Patent Application No. 19185859.6 (8 pages in English).

Japanese Office Action dated Dec. 20, 2022, in Counterpart Japanese Patent Application No. 2019-077030 (5 Pages in Japanese, 2 Pages in English).

\* cited by examiner

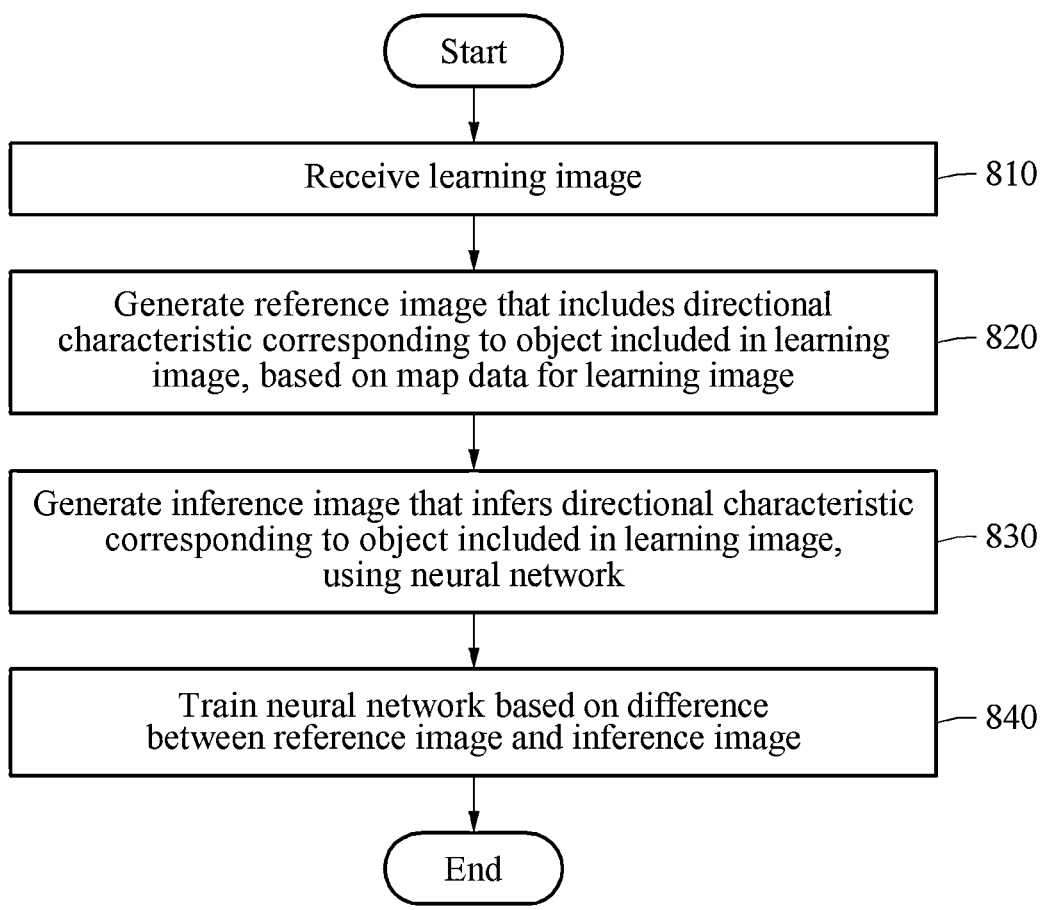

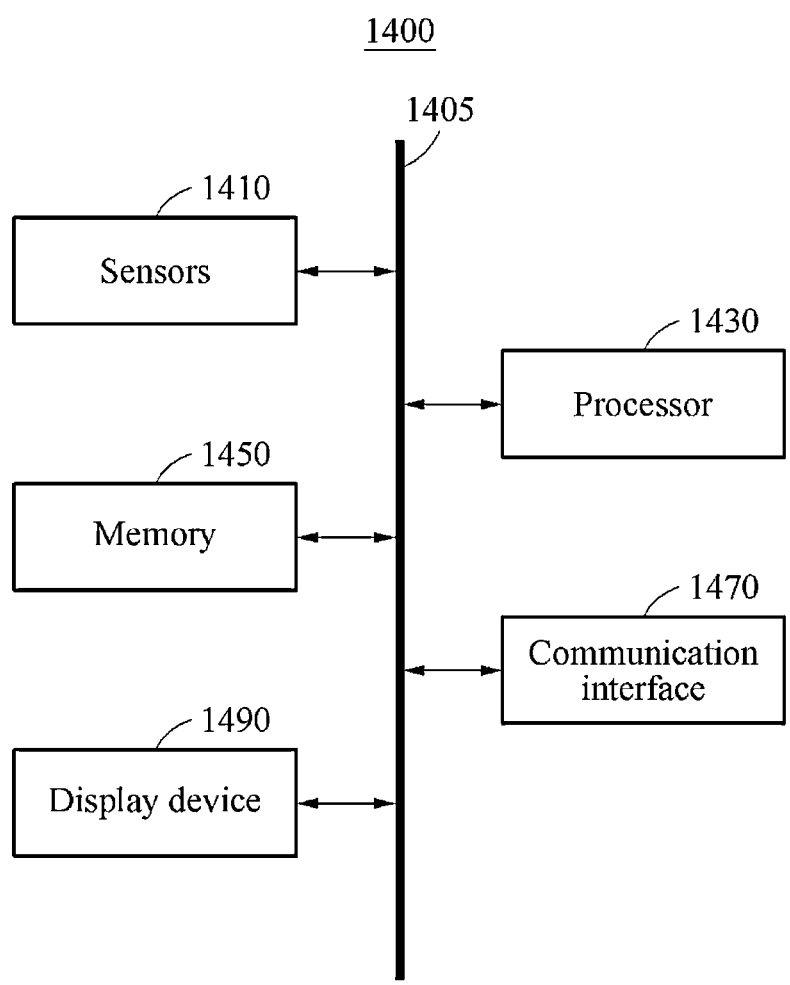

LOCALIZATION METHOD AND APPARATUS OF DISPLAYING VIRTUAL OBJECT IN AUGMENTED REALITY

CROSS-REFERENCE TO RELATED APPLICATIONS

This application is a continuation of U.S. application Ser. No. 16/259,420, filed on Jan. 28, 2019, and claims the benefit under 35 USC § 119(a) of Korean Patent Application No. 10-2018-0108252 filed on Sep. 11, 2018 in the Korean Intellectual Property Office, the entire disclosures of which are all incorporated herein by reference for all purposes.

BACKGROUND

1. Field

The following description relates to a localization method and apparatus for displaying a virtual object in augmented reality (AR).

2. Description of Related Art

Various types of augmented reality (AR) services are provided in various fields, such as, for example, driving assistance for vehicles and other transportation devices, games, and amusements. Various localization methods may be used to provide realistically AR. For example, a sensor-based localization method may use various sensors, for example, a global positioning system (GPS) sensor and an inertial measurement unit (IMU) sensor, to verify a location and a direction of an object. When high accuracy is required, a sensor-based localization method requires a very price sensor with high accuracy, and thus, commercialization and miniaturization is difficult. Also, a vision-based localization method using camera information to acquire highly precise coordinate information may be difficult to use in an environment with many dynamic objects having continuous motions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a localization method including acquiring localization information of a device, generating a first image including a directional characteristic corresponding to an object included in an input image, generating a second image in which the object is projected, based on the localization information, on to map data corresponding to a location of the object, and updating the localization information based on visual alignment between the first image and the second image.

The localization information may include a location of the apparatus and a pose of the apparatus.

The generating of the second image may include placing a virtual camera at the location on the map data, and adjusting a pose of the virtual camera based on the pose of the apparatus, and generating an image of a viewpoint at which the object is viewed from the virtual camera.

The directional characteristic may correspond to a probability distribution indicating a degree of closeness to the object.

The input image may be based on an output of a first sensor, and the localization information may be based on an output of a second sensor.

The localization method may include determining a virtual object on the map data for an augmented reality (AR) service, and displaying the virtual object and the input image may be based on the adjusted localization information.

The virtual object may represent driving route information.

The generating of the first image may include generating a probability map that represents the directional characteristic using a trained neural network.

Each pixel in the probability map may be configured to store a distance from the each pixel to a closest seed pixel.

The seed pixel may include a pixel corresponding to the object among pixels included in the input image.

The generating of the second image may include generating the second image using a transformer configured to transform a coordinate system of the map data to a coordinate system of the second image.

The localization information may include 6 degrees of freedom (6DoF).

The updating of the localization information may include calculating a degree of the visual alignment by matching the first image and the second image, and modifying the localization information to increase the degree of the virtual alignment based on the directional characteristic.

The calculating may include adding up values of pixels corresponding to the object in the second image from among pixels in the first image.

The modifying of the localization information based on the directional characteristic may include modifying the localization information to transform the object in the second image based on the directional characteristic.

The modifying of the localization information based on the directional characteristic may include moving or rotating the object in the second image based on the directional characteristic.

The first image may be configured to classify the object based on an object type and to store a directional characteristic for each object type, and the second image may be configured to classify the object based on the object type and to store the projected object for the each object type.

The modifying may include calculating a degree of visual alignment for each object type by matching the first image and the second image, and modifying the localization information to increase the degree of visual alignment based on the directional characteristic.

The input image may include a driving image of a vehicle.

The object may include any one or any combination of a line, a road surface marking, a traffic light, a sign, a curb stone, and a structure.

In another general aspect, there is provided a learning method including receiving a learning image, generating a reference image including a directional characteristic corresponding to an object in the learning image, based on map data for the learning image, generating an inference image that infers the directional characteristic corresponding to the object in the learning image, using a neural network, and training the neural network based on a difference between the reference image and the inference image.

The training may include training the neural network to minimize the difference between the reference image and the inference image.

The directional characteristic may correspond to a probability distribution indicating a degree of closeness to the object.

Each pixel in the reference image and the inference image may be configured to store a distance from the each pixel to closest a seed pixel.

Each of the reference image and the inference image may be configured to classify the object based on a type of the object and to store the directional characteristic for each object type.

The training may include training the neural network based on a type difference between the reference image and the inference image.

The learning image may include a driving image of a vehicle.

The object may include any one or any combination of a line, a road surface marking, a traffic light, a sign, a curb stone, and a structure.

In another general aspect, there is provided a localization apparatus including sensors configured to acquire localization information of a device and an input image, and a processor configured to generate a first image including a directional characteristic corresponding to an object included in the input image, to generate a second image in which the object is projected, based on the localization information, on to map data corresponding to a location of the object, and to adjust the localization information based on visual alignment between the first image and the second image.

In another general aspect, there is provided a localization method including acquiring an input image corresponding to a location of a device, receiving map data corresponding to a location of an object, generating second images in which the object is projected, based on plurality of respective candidate localization information, on to the map data, calculating a degree of visual alignment for each of the second images by matching the input image and the each of the second images, selecting a second image having the greatest degree of visual alignment from the second images, and updating localization information based on a candidate localization information corresponding to the selected second image.

The localization method may include generating a first image comprising a probability map indicating a directional characteristic corresponding to the object, and wherein the calculating of the degree of visual alignment may include matching the first image and the each of the second images.

In another general aspect, there is provided a localization apparatus including a first sensor configured to capture an image, a second sensor configured to acquire localization information of a device a head-up display (HUD), a processor configured to generate a first image including a directional characteristic corresponding to an object included in the image, generate a second image in which the object is projected, based on the localization information, on to map data corresponding to a location of the object, update the localization information based on visual alignment between the first image and the second image, and display the object and the input image on to the map data based on the adjusted localization information in the HUD for an augmented reality (AR) service.

Other features and aspects will be apparent from the following detailed description, the drawings, and the claims.

BRIEF DESCRIPTION OF THE DRAWINGS

FIG. 8 is a diagram illustrating an example of a learning method.

FIG. 14 is a diagram illustrating an example of a localization apparatus.

Figure 1A:
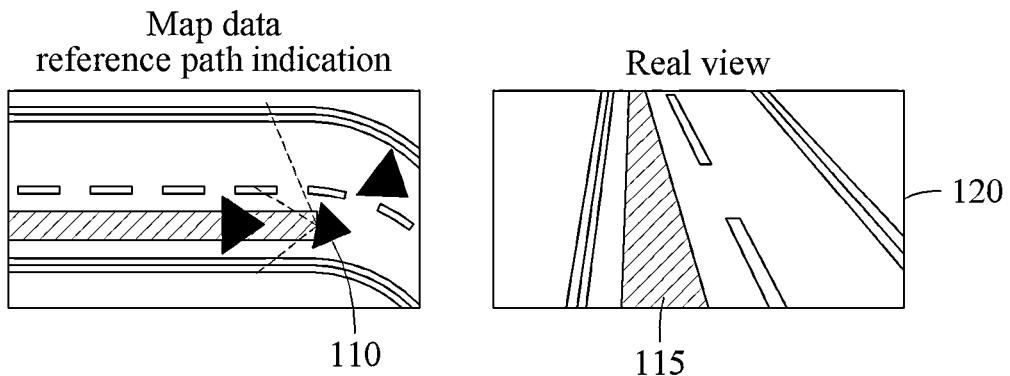
FIGS. 1A, 1B, and 1C illustrate examples of a visual alignment result corresponding to a localization error.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," "third" "A," "B," (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise. The terms "comprises," "comprising," "includes," and "including" specify the presence of stated features, numbers, operations, elements, components, or combinations thereof, but do not preclude the presence or addition of one or more other features, numbers, operations, elements, components, or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Hereinafter, the example embodiments are described with reference to the accompanying drawings. Like reference numerals used herein may refer to like elements throughout.

Figure 1B:
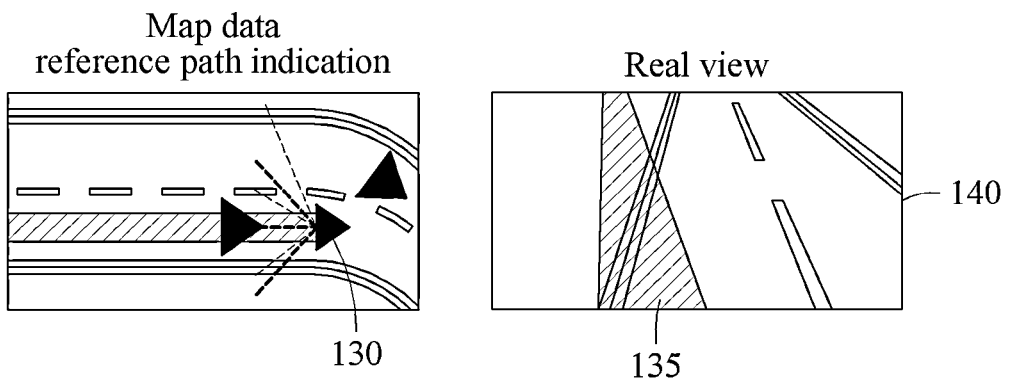
Figure 1C:
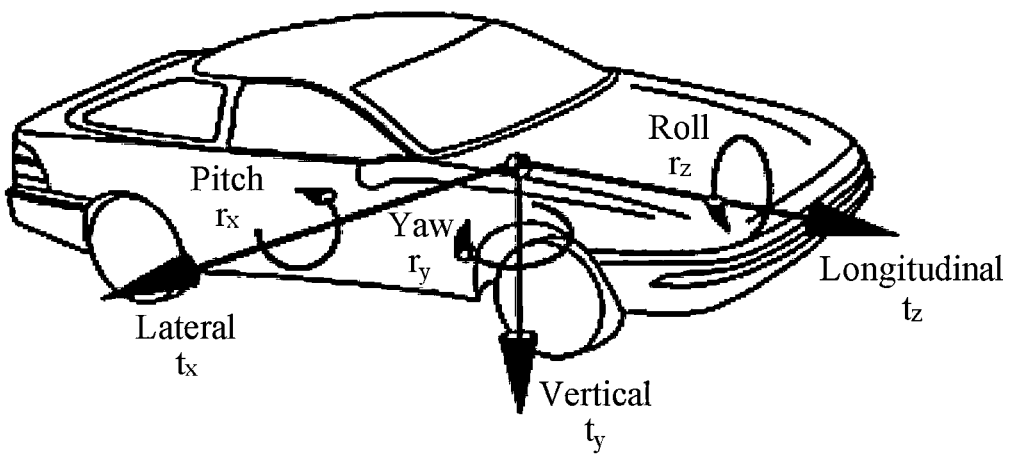

FIGS. 1A, 1B, and 1C illustrate examples of a visual alignment result corresponding to a localization error.

Augmented reality (AR) refers to adding or augmenting information based on reality to images and providing the added or augmented information. For example, the AR may provide an image in which a virtual object corresponding to a virtual image is added to an image or a background image of a real world. Since the real world and the virtual world are harmonized in the AR, a user may experience sense of immersion that enables real-time interaction between the user and the virtual world, without recognizing that a virtual environment is distinct from a real environment. To match the virtual object with a real image, a location and a pose, i.e., localization information of a user device or the user to which the AR is to be provided should be verified.

The localization information is used to locate a virtual object at a desired location in an image. In AR, a degree of visual alignment when projecting the virtual object onto a two-dimensional (2D) image is more important than an error occurring on an actual three-dimensional (3D) space or an error occurring in feature matching. The degree of visual alignment corresponds to, for example, an overlapping ratio or a matching ratio between the virtual object and the real image. The degree of visual alignment varies based on a localization error as shown in FIGS. 1A and 1B. Hereinafter, an example of displaying a driving guide lane corresponding to a virtual object on a road surface is described as an example.

In the following description, the examples described herein may be used to generate information to support a driver or to control an autonomous vehicle. The examples described herein may also be used to interpret visual information in a device, such as, for example, an intelligent system installed for fully autonomous driving or driving assistance in a vehicle, and used to assist safe and comfortable driving. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling, a smartphone, or a mobile device. The examples related to displaying a driving guide lane corresponding to a virtual object is provided as an example only, and other examples such as, for example, training, gaming, applications in healthcare, public safety, tourism, and marketing are considered to be well within the scope of the present disclosure.

Referring to FIG. 1A, an AR image 120 is based on a visual alignment result when a localization error is small. Referring to FIG. 1B, an AR image 140 is based on a visual alignment result when the localization error is large.

For example, a reference path of a vehicle is displayed on a road image based on localization information of an object 110. In an example, the object 110 corresponds to a user terminal and/or the vehicle that performs localization. When a localization error of the object 110 is small, a driving guide lane 115, i. e., a virtual object to be displayed, may be visually well aligned with an actual road image as shown in the AR image 120. When a localization error of an object 130 is large, a driving guide lane 135 that is a virtual object to be displayed may not be visually aligned with an actual road image as shown in the AR image 140.

In an example, an accurate AR service may be provided by optimizing localization information to increase a degree of visual alignment when projecting a virtual object onto a two-dimensional (2D) image.

Referring to FIG. 1C, localization information includes a location and a pose of an apparatus. The location corresponds to 3D coordinates (x, y, z). Here, x coordinate denotes a lateral location $t_x$, y coordinate denotes a vertical location $t_y$, and z coordinate denotes a longitudinal location $t_z$. Also, the pose corresponds to pitch $r_x$, yaw $r_y$, and roll $r_z$. For example, the location is acquired using, for example, a geographical positioning system (GPS) sensor and a lidar, and the pose is acquired using, for example, an inertial measurement unit (IMU) sensor and a gyro sensor. The localization information may be understood to include 6 degrees of freedom (6DoF) that includes the location and the pose.

In an example, the vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, a ADAS, or a drone. In an example, the smart mobility device includes mobility devices such as, for example, electric wheels, an electric kickboard, and an electric bike. In an example, vehicles include motorized and non-motorized vehicles, for example, a vehicle with a power engine (for example, a cultivator or a motorcycle), a bicycle or a handcart.

The term "road" is a thoroughfare, route, or connection, between two places that has been improved to allow travel by foot or some form of conveyance, such as a vehicle. A road can include various types of roads such as, for example, highways, national roads, farm roads, local roads, or high-speed national roads. A road may include a single lane or a plurality of lanes. Lanes correspond to road spaces that are distinguished from each other by road lines marked on a surface of a road. In an example, a "lane" is a space of a plane on which a vehicle is traveling among a plurality of lanes, i.e., as a space occupied and used by the vehicle. One lane is distinguished from the other lanes by right and left markings of the lane.

Also, the term "line" may be understood as various types of lines, for example, a solid line, a dotted line, a curved line, and a zigzagged line, which are marked in colors such as, white, blue, or yellow on the road surface. The line may correspond to a line on one side that distinguishes a single lane and may also be a pair of lines, that is, a left lane and a right lane corresponding to a lane boundary line that distinguishes a single lane a center line of road, and a stop line. In addition, a line may indicate an area prohibited for parking and stopping, a crosswalk, a towaway zone, and indication of speed limit.

The following examples may be applied for an AR navigation device in a smart vehicle, for example. In an example, the AR navigation device is used to mark a line, to generate visual information to help steering of an autonomous driving vehicle, or to provide a variety of control information for driving of a vehicle. The AR navigation device may provide visual information to a display. In an example, the display is a head-up display (HUD), a vehicular infotainment system, a dashboard in a vehicle, or a screen in the vehicle that used augmented reality. The display is installed for driving assistance or complete autonomous driving of a vehicle and to assist safe and pleasant driving. In an example, the display may also be implemented as an eye glass display (EGD), which includes one-eyed glass or two-eyed glasses.

Figure 2:
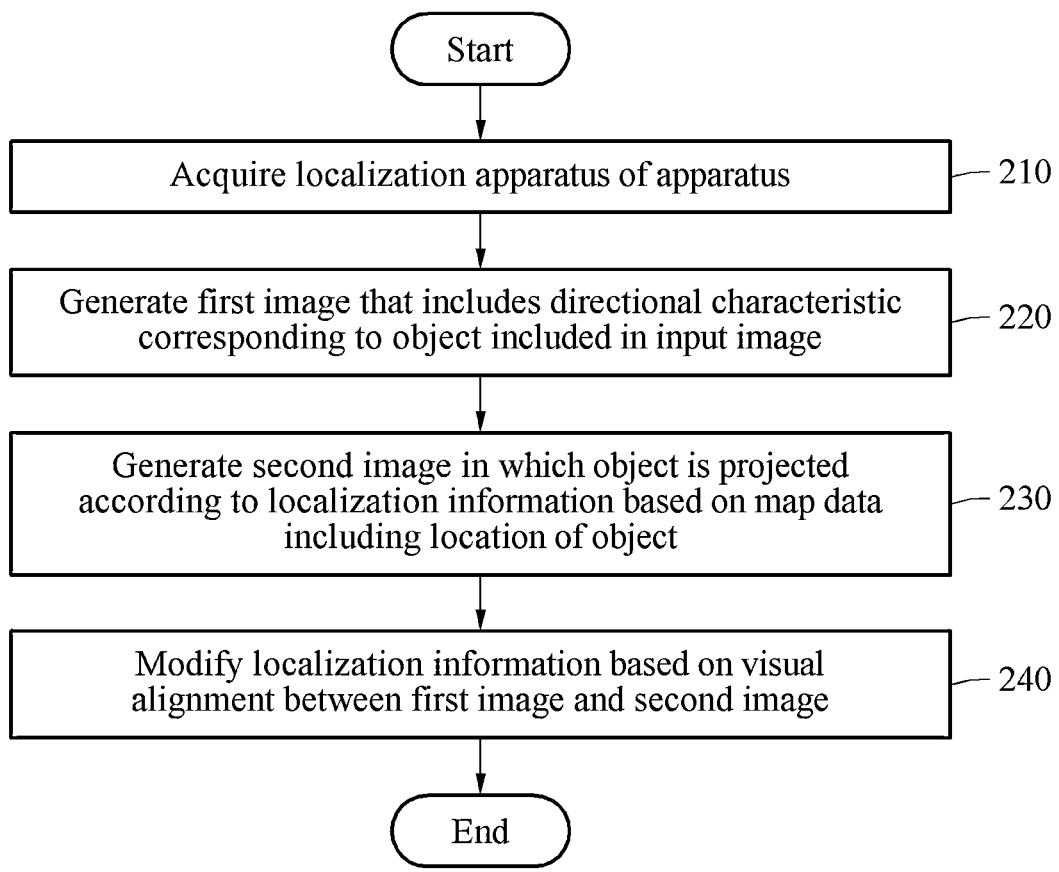
FIG. 2 is a diagram illustrating an example of a localization method.

FIG. 2 is a diagram illustrating an example of a localization method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, a localization apparatus acquires localization information of a corresponding apparatus. Here, the apparatus refers to an apparatus that performs the localization method, such as, for example, a vehicle, a navigation device, and a user device such as a smartphone. The localization information may have 6DoF that includes a location and a pose of the apparatus. The localization information is acquired based on output of a sensor, such as, for example, an IMU sensor, a GPS sensor, a lidar sensor, and a radar. The localization information may be, for example, initial localization information of the localization apparatus.

In operation 220, the localization apparatus generates a first image that includes a directional characteristic corresponding to an object included in an input image. The input image may correspond to a background image or another image that is displayed with a virtual object for an AR service. For example, the input image includes a driving image of the vehicle. The driving image may be captured from, for example, a photographing device mounted to the vehicle. In an example, the driving image includes a plurality of frames. The localization apparatus acquires the input image based on output of the photographing device. The photographing device is fastened at a location, such as, a for example, a windshield, a dashboard, a front fender, and a rear-view mirror, to capture an image ahead of the vehicle. The photographing device may include, for example, a vision sensor, an image sensor, or a device that performs a similar function. The photographing device may capture a single image or may capture an image per frame if needed. In another example, the driving image may be captured from another apparatus, aside from the localization apparatus. The driving image may be an input image 410 of FIG. 4. In one example, objects include a line, a road surface marking, a traffic light, a sign, a curb stone, a pedestrian, other vehicles, and a structure.

In operation 220, the localization apparatus generates a probability map, for example, a distance field map, indicating directional characteristic using a pretrained neural network. In an example, "directional characteristic corresponding to an object" may correspond to a probability distribution indicating a degree of closeness to the object. Here, each of pixels included in the probability map stores a distance from the corresponding pixel to a seed pixel closest. The seed pixel may be a pixel corresponding to the object among pixels included in an image. The first image may be, for example, a distance field map 550 of FIG. 5. A method of generating the probability map using the localization apparatus will be further described with reference to FIG. 5.

In operation 230, the localization apparatus generates a second image in which the object is projected according to the localization information based on map data including a location of the object. In an example, the map data is high-density (HD) map data. An HD map refers to a three-dimensional (3D) map having high density, for example, centimeter-based density, for autonomous driving. Line-based information, for example, a center line of road and a boundary line, and information, for example, a traffic light, a sign, a curb stone, a road surface marking, and various structures, may be included in the HD map in a 3D digital format. The HD map may be built using, for example, a mobile mapping system (MMS). The MMS refers to a 3D spatial information investigation system including various sensors, and may include a moving object with a sensor, such as, for example, a camera, a lidar, and a GPS for measurement of a location and geographical features. Sensors of the MMS interact with each other flexibly and acquire various and precise location information.

In operation 230, generating the second image in which the object is projected according to the localization information based on the map data means, for example, that the localization apparatus places a virtual camera at a location included in the localization information, on the map data, adjusts a pose of the virtual camera based on a pose included in the localization information, and generates an image of a viewpoint at which the object is viewed from the virtual camera.

In operation 230, the localization information generates the second image using, for example, a transformer that transforms a coordinate system of map data to a coordinate system of the second image. Here, the transformer may be, for example, a homographic function representing a transformation relationship between corresponding points when projecting one plane onto another plane or an artificial neural network that performs the transformation. The localization apparatus extracts partial data from the map data based on the localization information and generates the second image from the extracted partial data using the transformer. The second image may be, for example, a second image 430 of FIG. 4.

In operation 240, the localization apparatus modifies or adjusts the localization information based on visual alignment between the first image and the second image. The localization apparatus calculates a degree of the visual alignment by matching the first image and the second image. For example, the localization apparatus adds up values of pixels corresponding to an object included in the second image among a plurality of pixels included in the first image and determines a result of the addition as the degree of visual alignment. The degree of visual alignment may be represented in, for example, a gradient descent form. In an example, the localization apparatus modifies the localization information to increase the degree of visual alignment based on the directional characteristic corresponding to the object. The localization apparatus modifies the localization information to transform, for example, move or rotate, the object included in the second image based on the directional characteristic. A method of modifying, by the localization apparatus, the localization information will be further described with reference to FIG. 6.

The localization apparatus determines the virtual object on the map data for the AR service. For example, the virtual object may represent driving route information using an arrow indicator or a road marking indicating a direction of progress. The localization apparatus may display the virtual object and the input image on, for example, a head-up display (HUD), a navigation system, or a display of a user device based on the localization information modified in operation 240.

Figure 3:
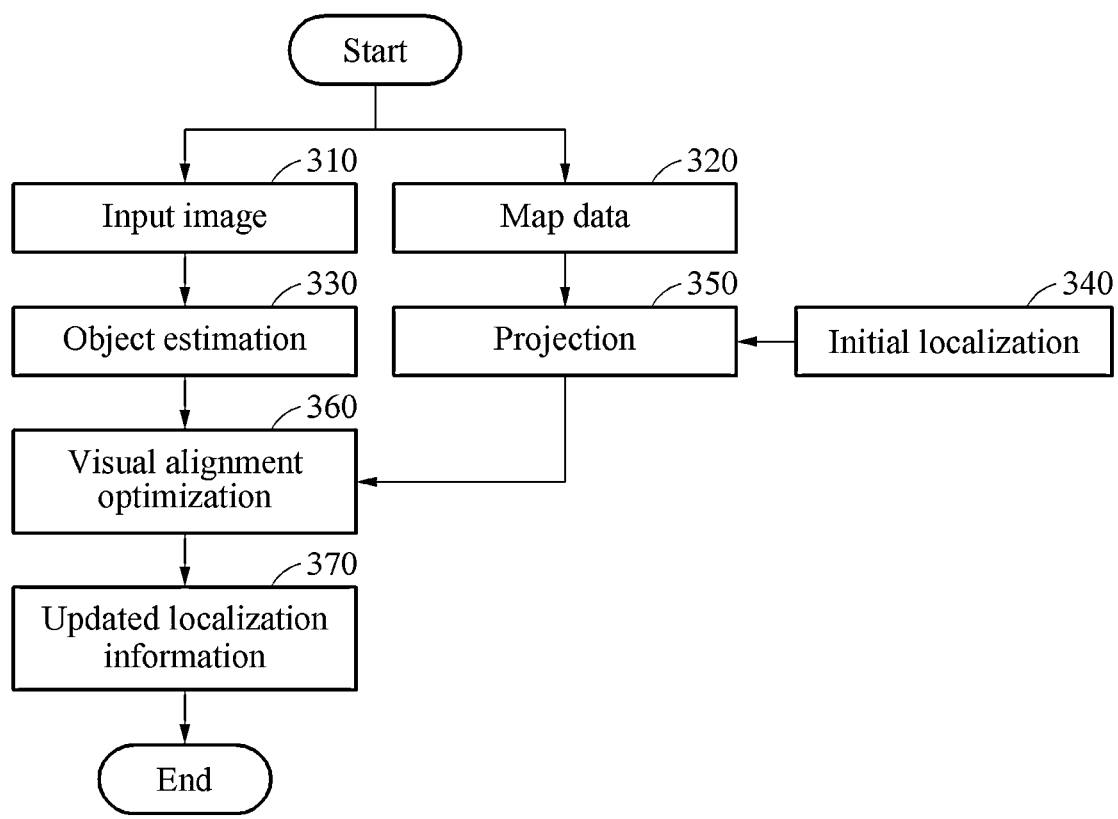
FIG. 3 illustrates an example of a localization method.
Figure 4:
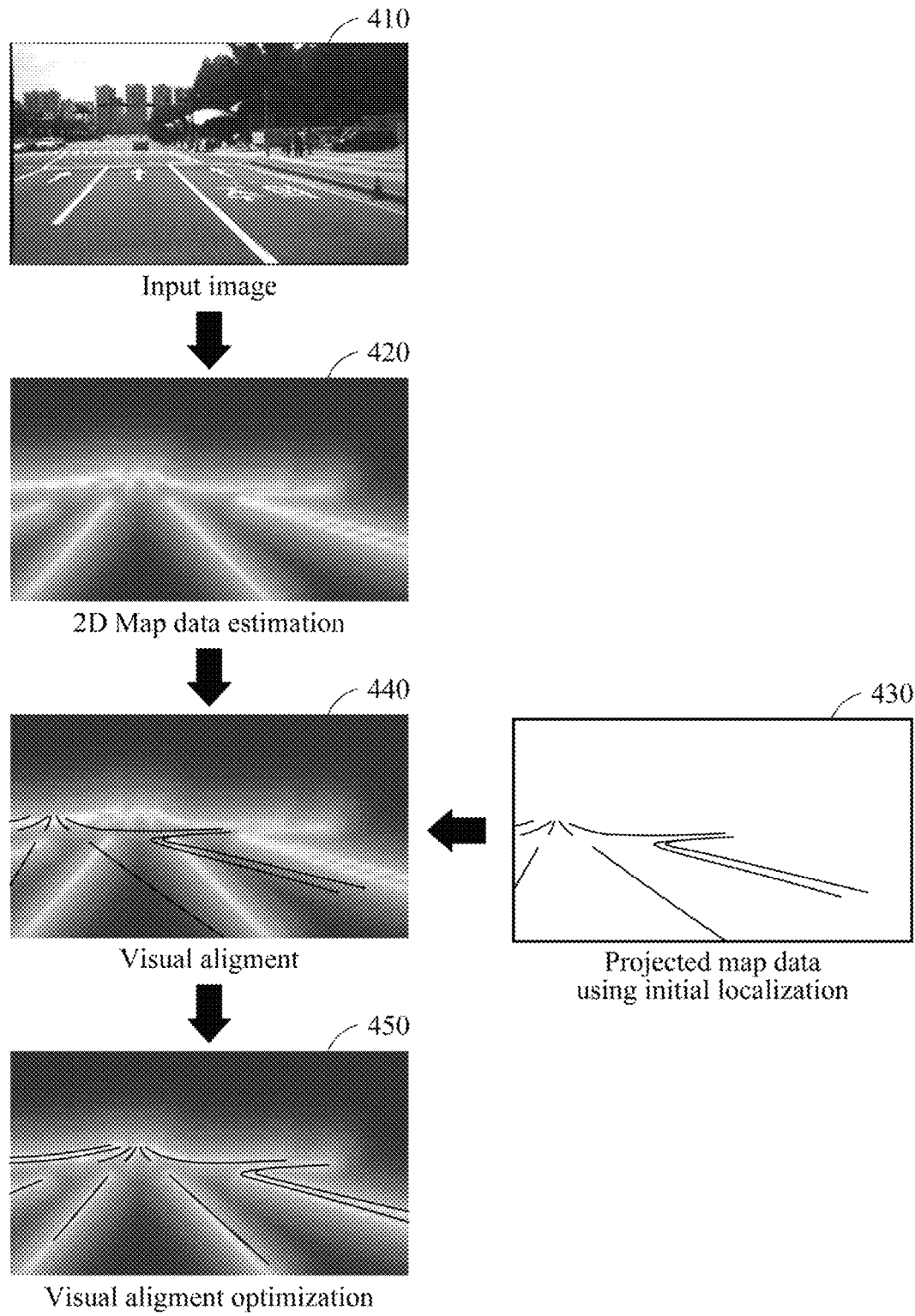
FIG. 4 illustrates an example of a localization process.

FIG. 3 illustrates an example of a localization method, and FIG. 4 illustrates an example of describing a localization process. The operations in FIGS. 3-4 may be performed in the sequence and manner as shown, although the order of some operations may be changed or some of the operations omitted without departing from the spirit and scope of the illustrative examples described. Many of the operations shown in FIGS. 3-4 may be performed in parallel or concurrently. One or more blocks of FIGS. 3-4, and combinations of the blocks, can be implemented by special purpose hardware-based computer that perform the specified functions, or combinations of special purpose hardware and computer instructions. In addition to the description of FIGS. 3-4 below, the descriptions of FIGS. 1-2 are also applicable to FIGS. 3-4, and are incorporated herein by reference. Thus, the above description may not be repeated here.

Referring to FIGS. 3 and 4, in operation 310, the localization apparatus acquires the input image 410. For example, the localization apparatus receives the input image 410 generated by capturing an object using an image sensor. Here, the input image 410 may be an image corresponding to a current location of an apparatus.

In operation 320, the localization apparatus receives or acquires map data that includes a location of the object.

In operation 330, the localization apparatus estimates the object from the input image 410 acquired in operation 310. The localization apparatus may generate a first image 420 that includes a directional characteristic corresponding to the object based on the input image 410. In an example, the localization apparatus generates the first image 420 using a pretrained neural network. The localization apparatus may use the pretrained neural network to stably estimate the object regardless of various obstacles, such as, for example, a vehicle, a pedestrian, and a street tree, in the input image 410. For example, when the input image 410 is applied, the pretrained neural network generates the first image 420 by activating a portion corresponding to a line in the applied input image 410. The first image 420 may include, for example, a 2D distance field map.

In operation 340, the localization apparatus performs initial localization. In operation 350, the localization apparatus generates the second image 430 in which the object is projected based on the initial localization by applying localization information corresponding to the initial localization on the map data that is acquired in operation 320.

The localization apparatus performs visual alignment on the first image 420 and the second image 430. The localization apparatus visually aligns the first image 420 and the second image 430, as shown in an image 440.

In operation 360, the localization apparatus optimizes the visual alignment. The localization apparatus calculates a localization modification value so that the first image 420 and the second image 430 may maximally overlap through the visual alignment. The localization apparatus may optimize the visual alignment by changing the localization information to maximize overlapping between the first image 420 and the second image 430 based on the initial localization performed in operation 340. In one example, gradient-based optimization may be readily performed using the first image 420 in which information is spread over the entire image, i.e., the distance field map.

In operation 370, the localization apparatus applies the localization modification value to the localization information and updates the localization information to optimize the visual alignment between the first image 420 and the second image 430, as shown in an image 450.

Figure 5:
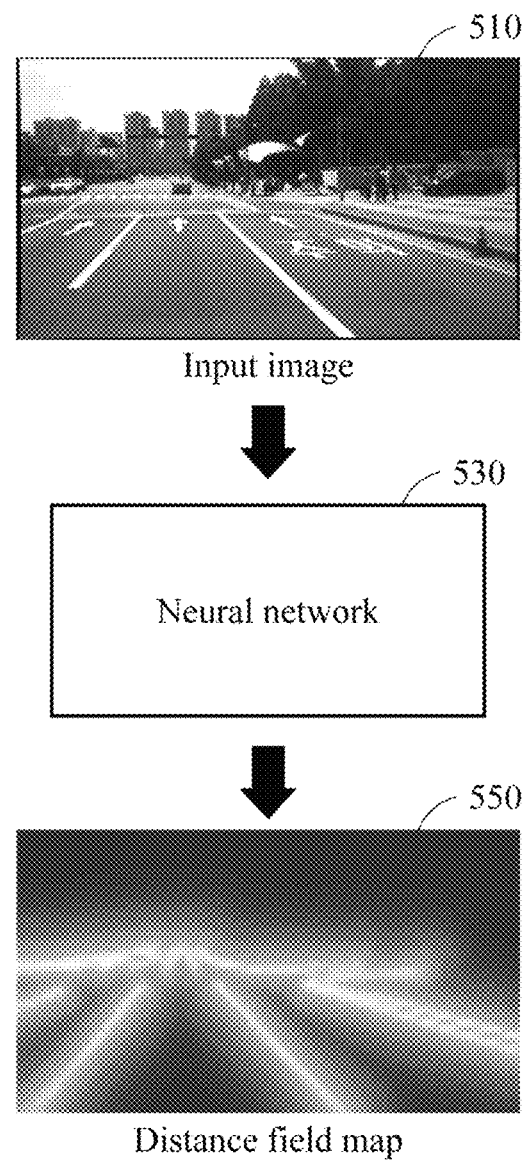
FIG. 5 illustrates an example of a process of generating a first image.

FIG. 5 illustrates an example of describing a process of generating a first image. A process of applying an input image 510 to a neural network 530 and generating a distance field map 550 corresponding to a first image will be described with reference to FIG. 5.

The neural network 530 refers to a neural network that is pretrained to generate a first image including a directional characteristic corresponding to an object included in the input image 510, based on the input image 510. The neural network 530 may be a deep neural network (DNN) or an n-layer neural network. The DNN or n-layer neural network may correspond to a convolutional neural network (CNN), a recurrent neural network (RNN), a deep belief network, a fully connected network, a bi-directional neural network, a restricted Boltzman machine, and a bidirectional long short term memory (BLSTM), or may include different or overlapping neural network portions respectively with full, convolutional, recurrent, and/or bi-directional connections. For example, the neural network 53—may be embodied as a CNN, but is not limited thereto.

The neural network 530 may be embodied as an architecture having a plurality of layers including an input image, feature maps, and an output. In the neural network 530, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network 530. In an example, in addition to the convolution layers, the neural network 530 may include a pooling layer or a fully connected layer.

The neural network 530 estimates the object included in the input image 510 based on a form of the distance field map 550. For example, when the first image includes directional characteristic information associated with a close object as in the distance field map 550, a directional characteristic of optimization may be readily determined using a gradient descent scheme. When the probability distribution indicating a degree of closeness to the object is distributed over the overall image as in the distance field map 550, an amount of data for learning may be increased. Performance of the neural network 530 may be enhanced compared to learning by sparse data.

Figure 6:
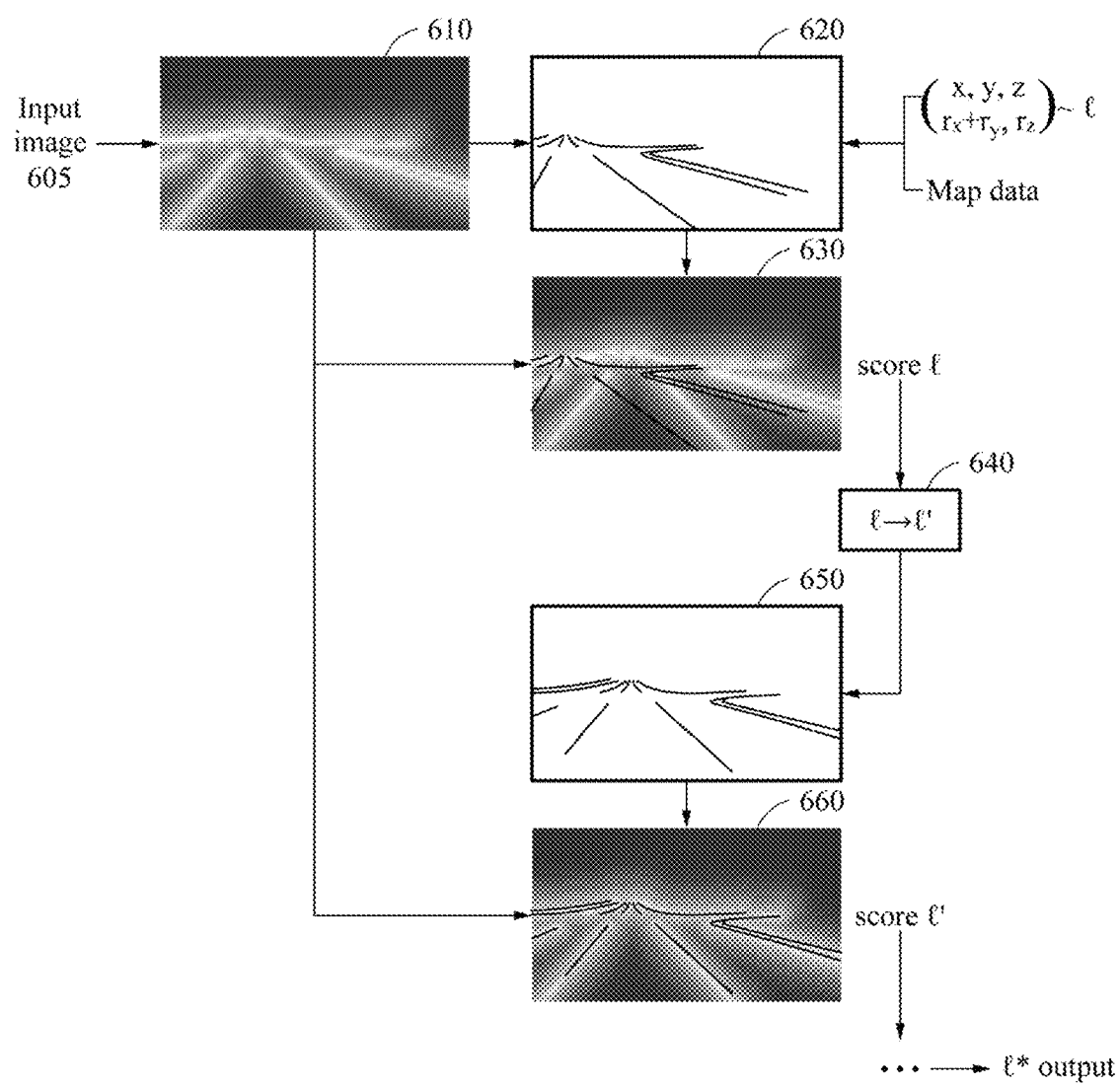
FIG. 6 illustrates an example of a method of modifying localization information.

FIG. 6 illustrates an example of describing a method of modifying localization information. FIG. 6 illustrates an input image 605, a first image 610, and a second image 620. The first image 610 is generated based on the input image 605. The second image 620 is generated by projecting an object based on localization information $(x, y, z, r_x, r_y, r_z)$ $\ell$ corresponding to an initial localization, based on map data.

The localization apparatus matches the first image 610 and the second image 620 to be an image 630 and calculates a degree of visual alignment therebetween in a form of, for example, score $\ell$. The localization apparatus adds up values of pixels corresponding to an object included in the second image 620 from among a plurality of pixels included in the first image 610 and calculates an addition result in the form of a score.

For example, each of the plurality of pixels included in the first image 610 may have a value between 0 and 1 based on a distance from an object adjacent to the respective pixel. Each pixel may have a value close to 1 as the distance from the adjacent object decreases and may have a value close to 0 as the distance from the adjacent object increases. The localization apparatus extracts pixels that match the second image 620 from among the plurality of pixels included in the first image 610, adds up values of the extracted pixels, and calculates a score.

The localization apparatus modifies localization information to increase the degree of visual alignment, i.e., the score $\ell$ based on the directional characteristic of the first image 610. The localization apparatus calculates a localization modification value so that the localization of the object included in the second image 620 fits the directional characteristic of the first image 610. The localization apparatus updates the localization information to be $\ell \rightarrow \ell'$ 640 by applying the localization modification value to the localization information corresponding to the initial localization. For example, the localization apparatus determines a direction in which the object of the second image 620 is to be moved to increase the score, based on the directional characteristic included in the first image 610. Once the localization information is updated, the object of the second image 620 is moved. Thus, the localization apparatus updates the localization information based on the directional characteristic included in the first image 610.

The localization apparatus generates an updated second image 650 based on the updated localization information $\ell'$. The localization apparatus calculates a score $\ell'$ by matching the updated second image 650 and the first image 610.

The localization apparatus calculates a localization modification value to maximize the score through the aforementioned process and outputs optimized localization information $\ell^*$.

Figure 7A:
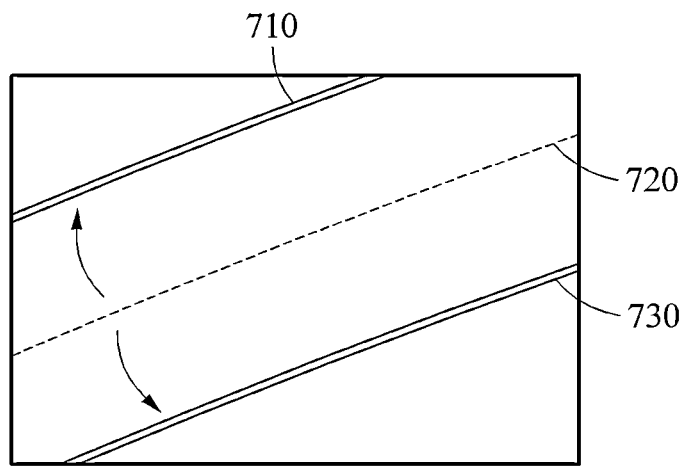
FIGS. 7A and 7B illustrate examples of a method of modifying localization information.
Figure 7B:
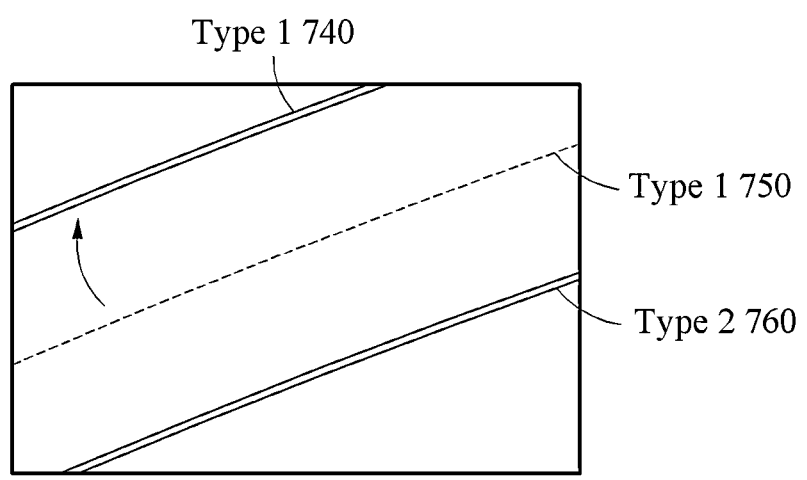

FIGS. 7A and 7B illustrate examples of describing a method of modifying localization information.

FIG. 7A illustrates an example in which objects included in an input image is not classified for each type. For example, when a line 710 and a line 730 correspond to objects included in a first image and a line 720 is included in a second image, the localization apparatus modifies localization information to increase a degree of visual alignment between the first image and the second image calculated by matching the first image and the second image. In one example, when each object type is not distinguished as illustrated in FIG. 7A, the localization apparatus may not accurately verify whether to match the line 720 and the line 710 or whether to match the line 720 and the line 730, which may make it difficult to accurately modify the localization information.

FIG. 7B illustrates an example in which objects in an input image are classified according to a type of the object. The first image may classify the object based on a type of the object and may store a directional characteristic for each type of object. Also, the second image may classify the object based on a type of the object and may store a projected object for each object type. For example, a line 740 and a line 760 may correspond to objects included in the first image. The line 740 may correspond to a first type (Type 1) and the line 760 may correspond to a second type (Type 2). Also, a line 750 may be included in the second image and correspond to the first type (Type 1).

Referring to FIG. 7B, when each of the objects is classified for each type, the localization apparatus matches the first image and the second image and calculates a degree of visual alignment for each object type. The localization apparatus modifies the localization information to increase the degree of visual alignment for each type based on the directional characteristic.

For example, the localization apparatus may calculate a degree of visual alignments for objects, the lines 740 and 750, corresponding to the first type (Type 1) and may modify localization information to increase the degree of visual alignment corresponding to the first type based on the directional characteristic. The localization apparatus may modify the localization information to match the objects that are the lines 740 and 750.

Figure 9:
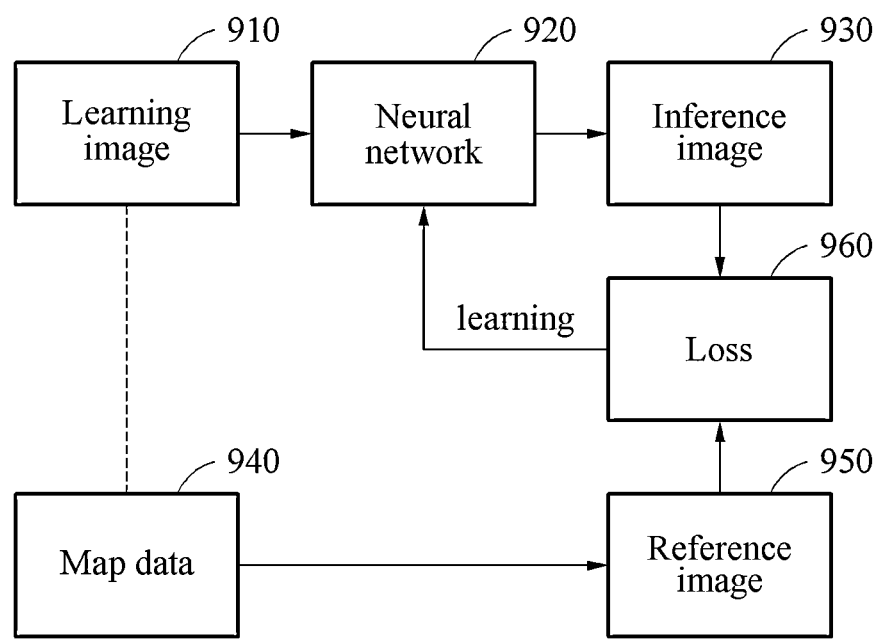
FIG. 9 illustrates an example of a learning process.

FIG. 8 is a diagram illustrating an example of a learning method, and FIG. 9 illustrates an example of a learning process. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. A training of a neural network, by a learning apparatus, to generate a first image from an input image to optimize localization information for AR will be described with reference to FIGS. 8, 9 and 10. In addition to the description of FIG. 8 below, the descriptions of FIGS. 1-7B are also applicable to FIG. 8, and are incorporated herein by reference. Thus, the above description may not be repeated here.

Referring to FIGS. 8 and 9, in operation 810, the learning apparatus receives a learning image 910. The learning image 910 may include, for example, a driving image of a vehicle. The learning image 910 may be, for example, a learning image 1010 of FIG. 10.

In operation 820, the learning apparatus generates a reference image 950 that includes a directional characteristic corresponding to an object included in the learning image 910, based on map data 940 for the learning image 910. In an example, the directional characteristic corresponds to a probability distribution indicating a degree of closeness to an object. The reference image 950 may correspond to a ground truth (GT) image. The reference image 950 may be, for example, a reference image 1030 or a reference image 1040 of FIG. 10.

In operation 830, the learning apparatus generates an inference image 930 that infers the directional characteristic corresponding to the object included in the learning image 910, using a neural network 920. The neural network 920 may be, for example, the neural network 530 of FIG. 5. A method of generating, by the learning apparatus, the inference image 930 will be further described with reference to FIG. 10.

In operation 840, the learning apparatus trains the neural network 920 based on a difference, for example, a loss 960 between the reference image 950 and the inference image 930. The learning apparatus may train the neural network 920 to minimize the difference between the reference image 950 and the inference image 930. The learning apparatus may train the neural network 920 through, for example, supervised learning. The learning apparatus may update the neural network 920 through a gradient descent scheme based on the loss 930 that is back-propagated to the neural network 920 through back-propagation learning and output values of nodes included in the neural network 920. The back-propagation learning refers to a method of estimating the loss 960 by performing forward computation on the reference image 950 and updating the neural network 920 to reduce the loss 960 while propagating the estimated loss 960 starting from an output layer of the neural network 920 toward a hidden layer and an input layer.

Figure 10:
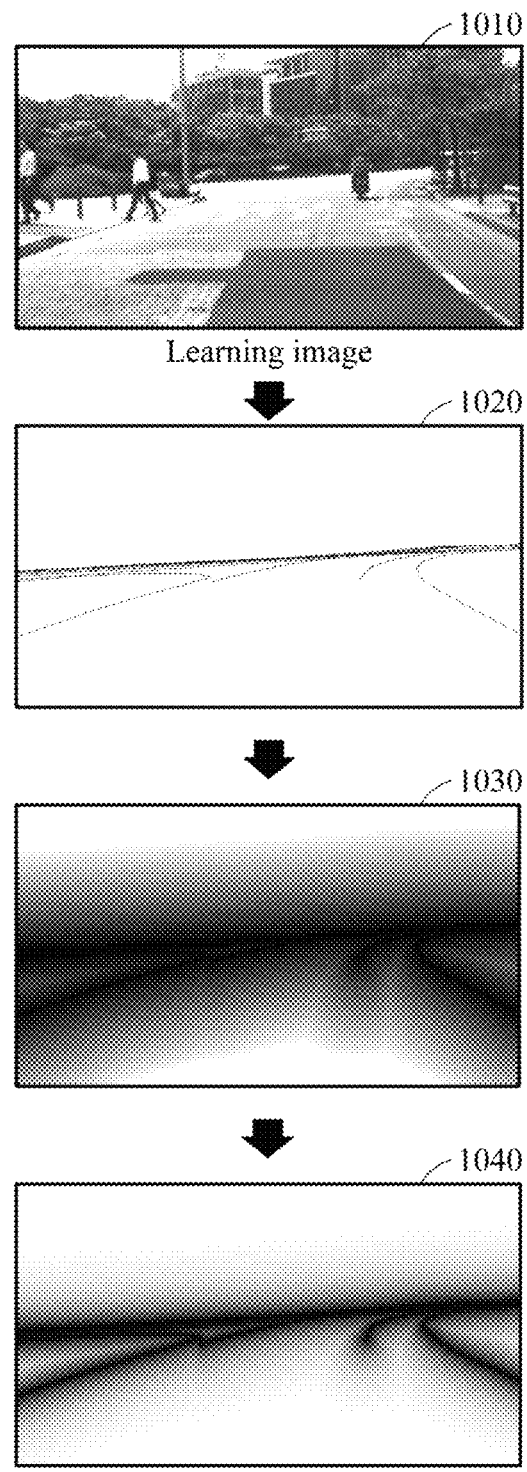
FIG. 10 illustrates an example of images for learning.

FIG. 10 illustrates an example of images for learning. FIG. 10 illustrates the learning image 1010, a map data image 1020, and the reference images 1030 and 1040.

Referring to FIG. 10, the learning apparatus trains a neural network to estimate the reference images 1030 and 1040 from the learning image 1010. In an example, the map data image 1020 represents objects in the learning image 1010 using a discrete binary value. Thus, when using the map data image 1020, learning information may be too sparse to smoothly perform learning. In an example, learning may be performed using a distance field map, such as the reference images 1030 and 1040. Sparse learning information may be spread across the overall image through the distance field map. When learning information is present over the entire target image as in the distance field map, it is possible to train the neural network based on sufficient learning information.

In an example, the learning apparatus generates the reference image 1030 or the reference image 1040 from the map data image 1020 by adjusting an importance of spread information in a distance field. For example, the learning apparatus may adjust an importance of spread information in the distance field, such as $e^{-0.02d}$. Here, d denotes a distance between a seed pixel corresponding to an object and a corresponding pixel.

Figure 11:
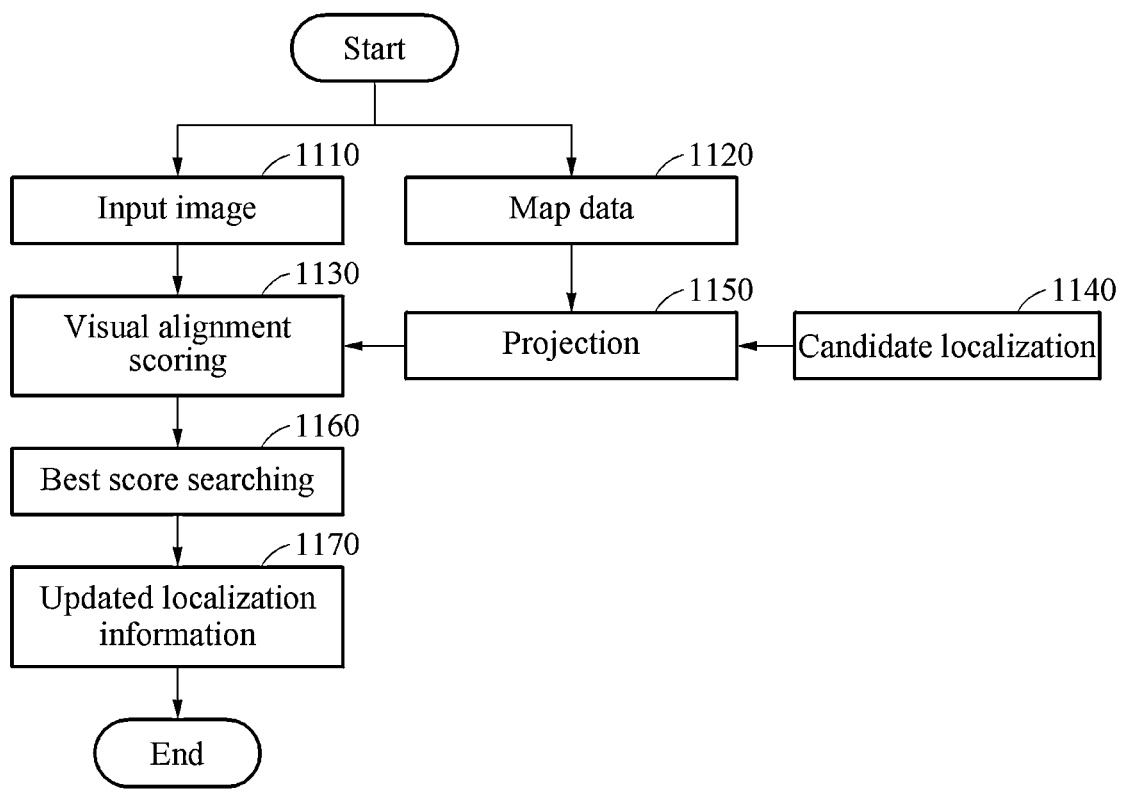
FIG. 11 illustrates an example of a learning method.
Figure 12:
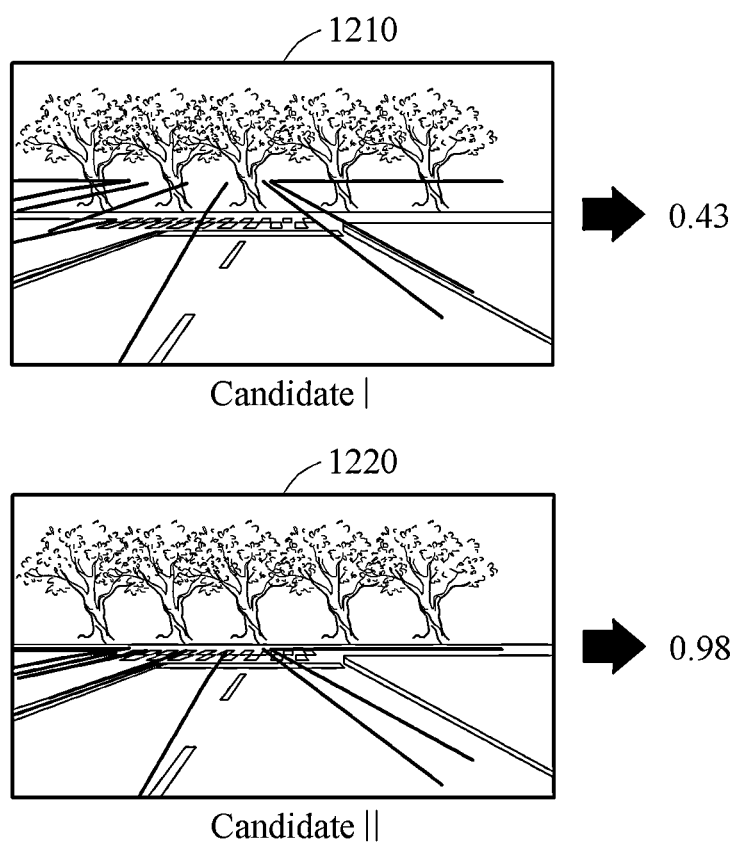
FIG. 12 illustrates an example of a localization updating process of FIG. 11.

FIG. 11 illustrates an example of a learning method, and FIG. 12 illustrates an example of a localization updating process of FIG. 11. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Referring to FIGS. 11 and 12, in operation 1110, the localization apparatus acquires an input image. In an example, the input image refers to an image corresponding to a current location of a corresponding apparatus.

In operation 1120, the localization apparatus receives or acquires map data that includes a location of an object. In operation 1140, the localization apparatus applies a plurality of pieces of candidate localization information to the map data acquired in operation 1120. In operation 1150, the localization apparatus generates second candidate images each in which an object is projected based on the candidate localization information. For example, the localization apparatus may generate second candidate images, for example, a first candidate image (candidate 1) 1210 and a second candidate image (candidate 2) 1220 of FIG. 12, each to which the candidate localization information is applied.

In operation 1130, the localization apparatus scores visual alignment between the input image and each of the second candidate images. For example, a degree of visual alignment between the input image and the first candidate image 1210 is scored as 0.43 and a degree of visual alignment between the input image and the second candidate image 1220 is scored as 0.98.

In operation 1160, the localization apparatus searches for a best score having a highest value from among the scores output in operation 1130. Referring to FIG. 12, the localization apparatus retrieves 0.98 as the best score from among the scores 0.43 and 0.98. In operation 1170, the localization apparatus updates the localization information by selecting a candidate localization corresponding to the best score retrieved in operation 1160.

Figure 13:
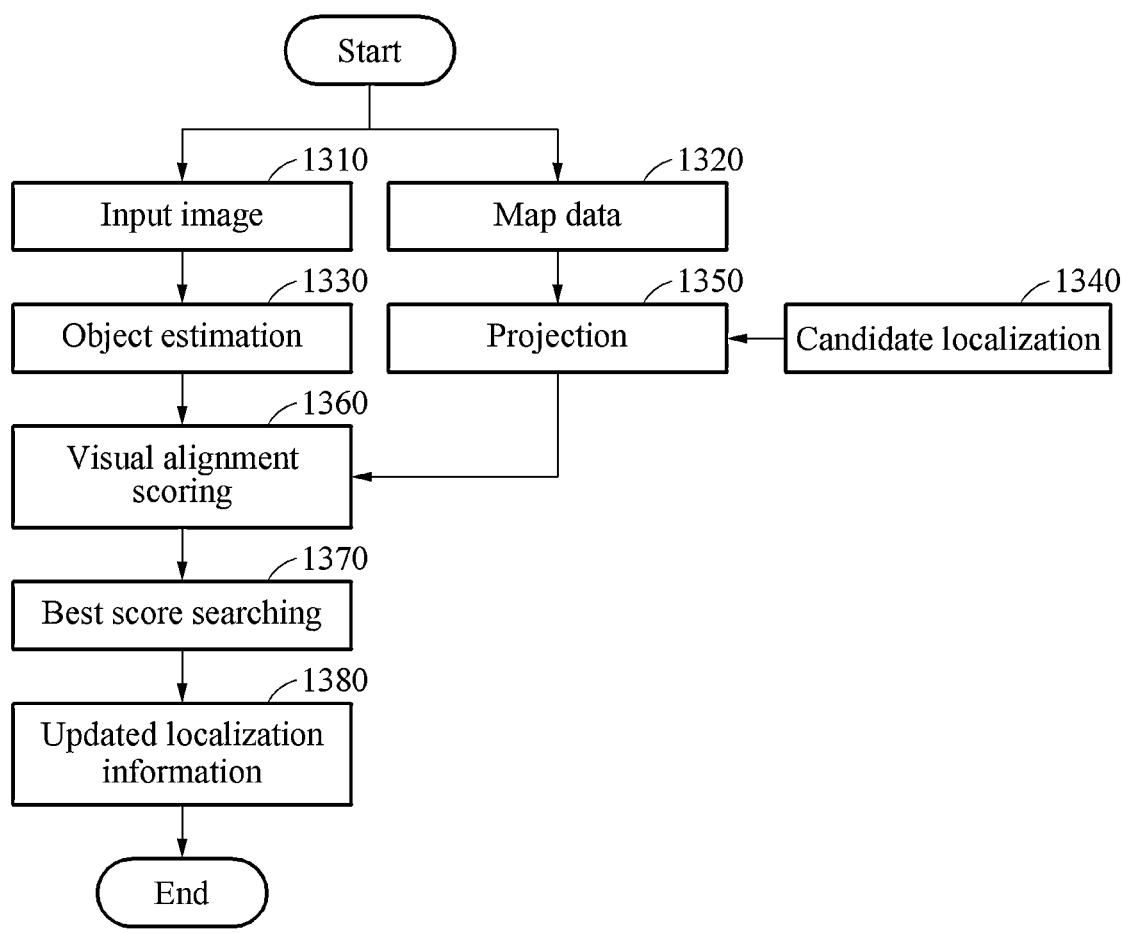
FIG. 13 is a diagram illustrating an example of a localization method.

FIG. 13 is a diagram illustrating an example of a localization method. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Referring to FIG. 13, the localization apparatus generates a first image, for example, a distance field map, from an input image by estimating an object in operation 1330 prior to scoring a degree of visual alignment in operation 1360. The localization apparatus calculates scores between the first image and second candidate images.

FIG. 14 is a diagram illustrating an example of a localization apparatus. Referring to FIG. 14, a localization apparatus 1400 includes sensors 1410 and a processor 1430. The localization apparatus 1400 further includes a memory 1450, a communication interface 1470, and a display device 1490.

The sensors 1410, the processor 1430, the memory 1450, the communication interface 1470, and the display device 1490 are connected to each other through a communication bus 1405.

The sensors 1410 may include, for example, an image sensor, a vision sensor, an accelerometer sensor, a gyro sensor, a GPS sensor, an IMU sensor, a radar, and a lidar. The sensor(s) 1410 may acquire an input image that includes a driving image of a vehicle. The sensor(s) 1410 may sense sensing information, for example, speed, acceleration, driving direction, handle steering angle of the vehicle, and a speed of the vehicle, in addition to localization information, for example, GPS coordinates, a location, and a pose of the vehicle.

In an example, the processor 1430 generates a first image that includes a directional characteristic corresponding to an object included in the input image. In an example, the processor 1430 generates a second image in which the object is projected based on localization information, based on map data that includes the location of the object. In an example, the processor 1430 modifies the localization information based on visual alignment between the first image and the second image.

In an example, the localization apparatus 1400 acquires a variety of sensing information including the input image from various sensors through the communication interface 1470. In one example, the communication interface 1470 receives sensing information including a driving image from other sensors outside the localization apparatus 1400.

The processor 1430 provides an AR service by outputting the modified localization information through the communication interface 1470 and/or the display device 1490 or by displaying a virtual object and the input image on map data based on the modified localization information. Also, the processor 1430 may perform the one or more methods described with reference to FIGS. 1 to 13 or an algorithm corresponding thereto.

The processor 1430 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). Further details on the processor 1430 are provided below.

The processor 1430 executes the program and controls the localization apparatus 1400. The program code executed by the processor 1430 may be stored in the memory 1450.

The memory 1450 stores the localization information of the localization apparatus 1400, the first image, the second image, and/or the modified localization information. The memory 1450 stores a variety of information that is generated during a processing process of the processor 1430. In an example, the memory 14450 stores the map data. In addition, the memory 1450 stores a variety of data and programs. The memory 1450 may include, for example, a volatile memory or a non-volatile memory. The memory 1450 may include a mass storage medium, such as a hard disk, to store a variety of data. Further details on the memory 1450 are provided below.

The display device 1490 outputs the localization information modified by the processor 1430, or displays a virtual object with the input image on map data based on the modified localization information. In an example, the display device 1490 is a physical structure that includes one or more hardware components that provide the ability to render a user interface and/or receive user input. In an example, the localization information or the virtual object with the input image on map data based on the modified localization information is displayed on a wind shield glass or a separate screen of the vehicle using a head-up display (HUD) or is displayed on an augmented reality head-up display (AR HUD). In an example, the localization apparatus 1400 transmits the localization information to an electronic control unit (ECU) or a vehicle control unit (VCU) of a vehicle. The ECU or the VCU displays the localization information on display device 1490 of the vehicle.

However, the displaying of the object is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the localization apparatus 1400 may be used without departing from the spirit and scope of the illustrative examples described.

In one example, the localization apparatus may perform the localization method independent of a viewpoint by updating 3D localization information of the localization apparatus using a result of performing the localization method based on a photographing apparatus, although a viewpoint between the photographing device and the localization apparatus does not match, such as, for example, an HUD and AR glasses. Also, when the viewpoint between the photographing device and the localization information matches, such as, for example, a mobile terminal and a smartphone, the localization apparatus may update 3D localization information and, additionally, may directly use a 2D location in an image for modification.

The localization apparatus, processor 1430 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A localization method comprising:
   generating a first image with a directional characteristic corresponding to a first object included in an input image, such that each of pixels in the first image, being generated, indicates respective distances between positions of pixels of the input image corresponding to the pixels in the first image and positions of seed pixels of the first object in the input image;
   generating a second image to which a second object included in three-dimensional (3D) map data is projected dependent on acquired localization information of a device, wherein the second object is of a same object type as the first object; and
   updating the localization information based on a degree of visual alignment between the first image and the second image, so as to increase the degree of visual alignment between the first image and the second image,
   wherein the degree of visual alignment is dependent on a pooling of respective values of pixels, of the first image, corresponding to pixels of the second object of the second image,
   wherein the acquired localization information comprises a location of the device and a pose of the device, and
   wherein the generating of the second image comprises:
   adjusting a pose of a virtual camera, corresponding to the location on the 3D map data, based on the pose of the device; and generating an image of a viewpoint at which the second object is viewed from the virtual camera.

2. The localization method of claim 1, wherein the directional characteristic corresponds to a probability distribution indicating the respective distances from the pixels in the first image.

3. The localization method of claim 1, further comprising:
determining a virtual object on the 3D map data for an augmented reality (AR) service; and
displaying the virtual object and the input image based on the updated localization information.

4. The localization method of claim 3, wherein the virtual object represents driving route information.

5. The localization method of claim 1, wherein the generating of the first image comprises generating, using a trained neural network, a probability map that represents the directional characteristic.

6. The localization method of claim 5, wherein each pixel in the probability map is configured to store a distance from the each pixel to a corresponding closest seed pixel of the seed pixels.

7. The localization method of claim 6, wherein the seed pixels are pixel corresponding to the first object among pixels included in the input image.

8. The localization method of claim 1, wherein the generating of the second image comprises generating the second image using a transformer configured to transform a coordinate system of the 3D map data to a coordinate system of the second image.

9. The localization method of claim 1, wherein the first image is configured to classify the first object based on an object type and to store a directional characteristic for each object type, and
the second image is configured to classify the second object based on the object type and to store the projected object for the each object type.

10. A non-transitory computer-readable storage medium storing instructions that, when executed by a processor, cause the processor to perform the localization method of claim 1.

11. A localization apparatus comprising:
a processor configured to:
generate a first image with a directional characteristic corresponding to a first object included in an input image, such that each of pixels in the first image, being generated, indicates respective distances between positions of pixels of the input image corresponding to the pixels in the first image and positions of seed pixels of the first object in the input image;
generate a second image to which a second object included in three-dimensional (3D) map data is projected dependent on acquired localization information, wherein the second object corresponds to the first object, and the second object is of a same object type as the first object; and
adjust the localization information based on a degree of visual alignment between the first image and the second image, so as to increase the degree of visual alignment between the first image and the second image,
wherein the degree of visual alignment is calculated dependent on a pooling of respective values of pixels, of the first image, corresponding to pixels of the second object of the second image,
wherein the acquired localization information comprises a location of the apparatus and a pose of the apparatus, and
wherein the generating of the second image comprises:
adjusting a pose of a virtual camera, corresponding to the location on the 3D map data, based on the pose of the apparatus; and
generating an image of a viewpoint at which the second object is viewed from the virtual camera.

12. The localization apparatus of claim 11, wherein the directional characteristic corresponds to a probability distribution indicating the respective distances from the pixels in the first image.

13. The localization apparatus of claim 11, wherein the processor is further configured to
determine a virtual object on the 3D map data for an augmented reality (AR) service, and
synthesize the virtual object and the input image based on the adjusted localization information.

14. The localization apparatus of claim 13, further comprising a display,
wherein, for the synthesizing of the virtual object and the input image, the processor is configured to control the display to display a result of the synthetization.

15. The localization apparatus of claim 13, wherein the virtual object represents driving route information.

16. The localization apparatus of claim 11, wherein the processor is further configured to generate, using a trained neural network, a probability map that represents the directional characteristic.

17. The localization apparatus of claim 16, wherein each pixel in the probability map is configured to store a distance from the each pixel to a corresponding closest seed pixel of the seed pixels.

18. The localization apparatus of claim 17, wherein the seed pixels are pixels corresponding to the first object among pixels included in the input image.

19. The localization apparatus of claim 11, wherein the first image is configured to classify the first object based on an object type and to store a directional characteristic for each object type, and
the second image is configured to classify the second object based on the object type and to store the projected object for the each object type.

20. A device comprising:
a processor configured to:
generate a first image with a directional characteristic corresponding to a first object included in a captured image, wherein pixel values in the first image indicate respective degrees of closeness to seed pixels of the first object; and
adjust acquired localization information of the device to reflect a first degree of visual alignment, between the first image and first image information of a first projection of a second object dependent on the acquired localization information of the device, being less than a second degree of visual alignment between the first image and a second projection of the second object dependent on the adjusted localization information,
wherein the first degree of visual alignment is dependent on a pooling of values of pixels of the first image corresponding to pixels of the first image information for the second object, and
wherein the second object is a same object type as the first object, and the first projection of the second object dependent on the acquired localization information of the device is a projection of the second object as included in three-dimensional (3D) map data.

21. The device of claim 20, wherein the acquired localization information of the device reflects a location of the device and a pose of the device, and
for the first projection of the second object the processor is configured to:
adjust a pose of a virtual camera, corresponding to the location on the 3D map data, dependent on the pose of the device; and
generate a second image, including the first image information, to which the second object included in the three-dimensional (3D) map data is projected dependent on the acquired localization information of the device, by generating an image of a viewpoint at which the second object is viewed from the virtual camera.

22. The device of claim 21, wherein the first degree of visual alignment is between the first image and the generated second image.

23. The device of claim 20, further comprising a display, wherein the processor is configured to:
determine a virtual object on the 3D map data for an augmented reality (AR) provision, and
control the display to display the virtual object based on the adjusted localization information.

24. The device of claim 23, wherein the display is a glass display.

25. The device of claim 23, further comprising:
a camera, wherein the captured image is captured by the camera; and
a localization information sensor, including any one or any combination of any two or more of an accelerometer sensor, a gyro sensor, a GPS, an inertial measurement unit (IMU) sensor, a radar, and a lidar, wherein the acquired localization information of the device is acquired using the localization information sensor.

* * * * *